Figure 1:
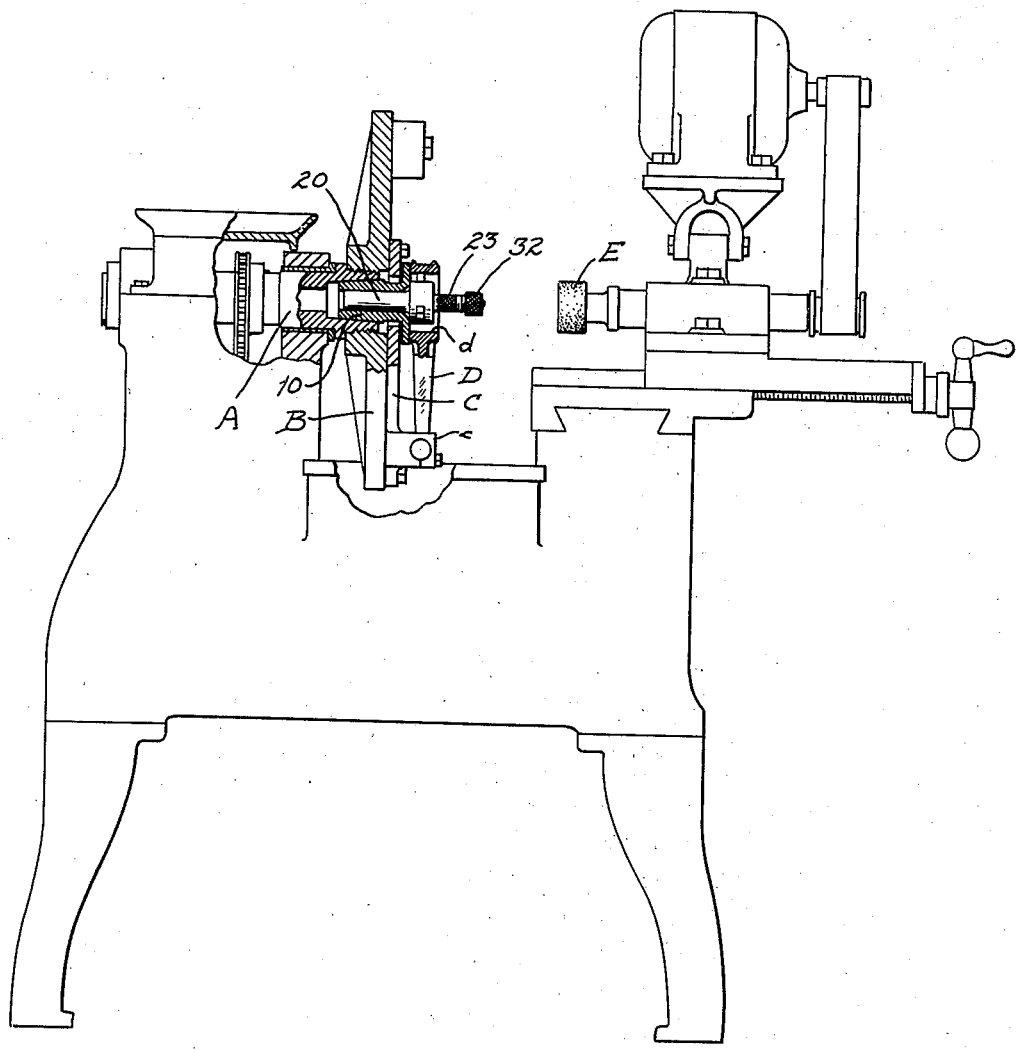

Sept. 19, 1939.  J. Y. BLAZEK  2,173,530
CENTERING TOOL
Filed Aug. 26, 1938  2 Sheets-Sheet 1

INVENTOR.
JOHN Y. BLAZEK
BY
Bates, Goldrick, & Teare
ATTORNEYS

Sept. 19, 1939.　　　　J. Y. BLAZEK　　　　2,173,530
CENTERING TOOL
Filed Aug. 26, 1938　　　　2 Sheets-Sheet 2

INVENTOR.
JOHN Y. BLAZEK
BY Bates, Goldrick, & Teare
ATTORNEYS

Patented Sept. 19, 1939

2,173,530

UNITED STATES PATENT OFFICE 2,173,530

CENTERING TOOL

John Y. Blazek, Maple Heights, Ohio, assignor to Lempco Products Inc., Cleveland, Ohio, a corporation of Ohio Application August 26, 1938, Serial No. 226,955

8 Claims. (Cl. 51—277)

This invention relates to a centering device for positioning the work in a machine tool. More particularly the invention provides a device adapted to be mounted in axial alignment with the work spindle of the tool, and coact with the peripheral wall of a hole in the object, so that the object may be immediately positioned ready to be clamped to the work spindle or face plate in proper position for machining, or grinding of the hole concentric with the work spindle.

As an illustration, my centering tool is well adapted for positioning an automobile connecting rod on the face plate of a grinding machine so that the opening which embraces the crank, or that which embraces the wrist pin, may be ground in true cylindrical form.

My invention comprises a member adapted to be positioned in a central bore in a rotatable work spindle and having a head carrying radially movable blocks to engage the inner periphery of the hole in the article to be clamped. An expanding device is carried by the head and operates to shove all of the blocks outwardly, equally, and retain them in their outermost positions until the positioned article has been clamped by a suitable jig on the face plate of the machine, then the outward pressure on the movable blocks is released, and the tool is removed from the work spindle leaving the article properly positioned and clamped by the jig. The jig is specifically designed to cooperate with my centering tool and is claimed in combination with it.

More specific features of my invention will be apparent from the following description of a preferred embodiment thereof illustrated in the drawings.

Figure 3:
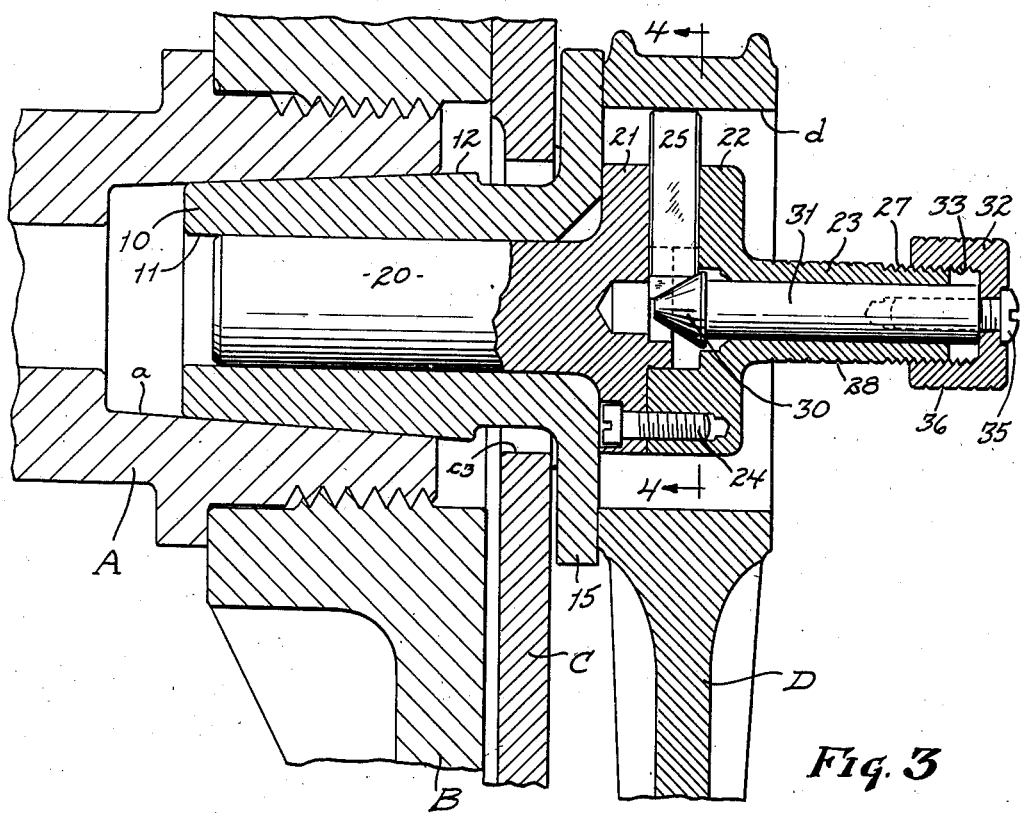
Figure 2:
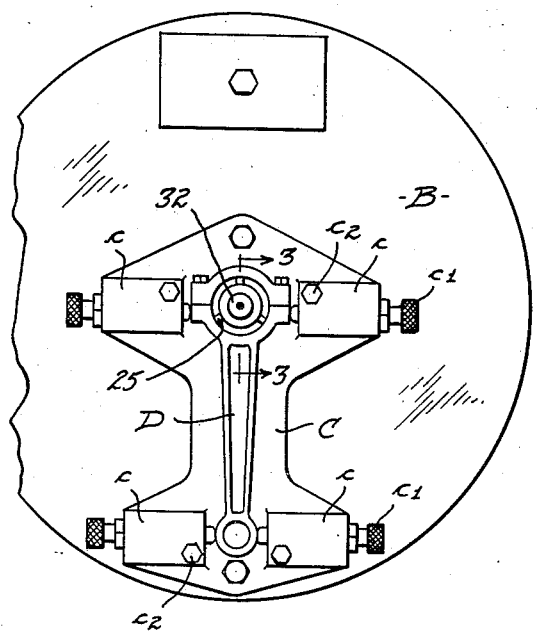
Figure 4:
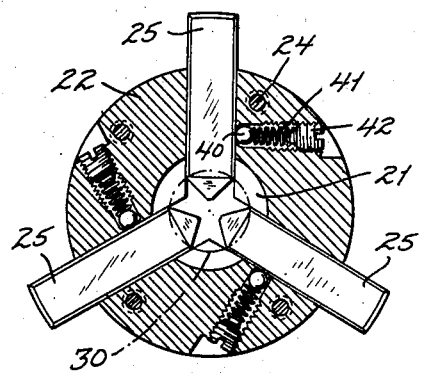

In the drawings, Fig. 1 is a side elevation of a suitable machine tool, for instance, a grinding machine having a work spindle, with my centering tool mounted therein, and showing also an article centered by the centering tool in position to be clamped by the jig on the face plate carried by the work spindle; Fig. 2 is an elevation of the face plate of the machine, with the jig and work mounted thereon, looking toward the work spindle; Fig. 3 is a vertical section through the axis of the work spindle on the line 3—3 in Fig. 2, but on a larger scale, showing the centering tool in its active position; Fig. 4 is a cross-section of the centering tool on the line 4—4 on Fig. 3.

In Figs. 1, 2 and 3, A indicates a rotatable work spindle carrying a usual face plate B; C indicates a jig which may be clamped to the face plate and support the work, as for instance, the connecting rod D with the bearing opening $d$ thereof in position for engagement by the grinding wheel E.

My centering tool, about to be described, is removably mounted in the spindle A, and engages the bearing $d$ to accurately position the work, preliminary to its being clamped by the jig C.

The holder for the centering tool comprises a bushing 10 having a cylindrical interior 11 and a tapered exterior 12 which may make a snug binding fit with a tapered recess in the endmost portion of the spindle A. The bushing 10 preferably has a flange 15 which lies close to the face of the jig C.

The centering tool proper has a cylindrical shank 20 adapted to occupy the bore 11 of the tapered bushing. This shank has a flange 21. Secured to the flange 21, which is of circular form, is a disk-like member 22, having a tubular boss 23, suitable screws 24 securing the two disk-like portions together to provide a rigid head on the shank 20.

Radially mounted in the head are a plurality of movable blocks 25, three being shown. The blocks are mounted in mating grooves in the two portions of the head which provide ways rectangular in cross-section, for the blocks. The inner ends of the blocks are bevelled in such manner that they may be engaged by a conical head 30, on a plunger 31 slidably mounted in the tubular boss 23.

On the exterior of the boss 23, near its free end, are external screw threads 27, and mounted on the end of the plunger 31 is a cap 32 having internal threads 33 engaging the threads 27 of the boss. The cap is clamped to the plunger by a screw 35. Accordingly, when the cap is rotated the cone may be forced inwardly to bear on the inclined ends of the blocks 25 and force all of them outwardly equally. Thus these blocks may be forced against the bearing wall $d$ of the article D and position such article accurately concentrically of the work spindle.

After the positioning of the article has been effected by the turning in of the cap 32 the jig screws are tightened to definitely clamp the article in place; then the cap 32 is rotated in the reverse direction releasing the pressure on the blocks, whereupon the cap and the boss 23 form a convenient handle for the removal of the entire centering device, leaving the article clamped by the jig.

For convenient manual handling of the centering tool, the exterior of the cap 32 is knurled, as at 36, and the exterior of the boss 23 is knurled as at 28, enabling these parts to be readily grasped by the operator's hands, and the boss held, and the screw rotated as desired.

To provide sufficient friction so that the radial blocks in the tool head will normally remain in any position given them, and not tend to drop out of the head when it is removed, I provide spring pressed plungers mounted in the head and bearing against the respective blocks. I may provide this by drilling three holes into the head at right angles to the face of the blocks respectively, the innermost end of the hole being of reduced diameter such as may conveniently be made by the point of the drill, and mounting in these holes balls 40 which bear against the respective blocks and are pressed against them. The pressure may be effected by springs 41 in the holes which are positioned by screw-threaded plugs 42 screwed into threads in the outermost portions of these holes, as illustrated in Fig. 4. This makes a very convenient arrangement for providing satisfactory friction for the blocks.

The jig to be employed with my centering tool is preferably a device which may be bolted to the face plate, has an opening for the free passage of the bushing of the centering tool, and carries set screws adapted to engage and clamp the work after it has been positioned by the centering tool. As shown in Figs. 1 and 2, such jig C has a base plate carrying four bosses c, in which are mounted set screws c1, adapted to bear against the work. The bosses may be split on one side, as shown in Fig. 1, which enables the tightening of clamp screws c2, to bind the set screws and hold them effectively in position after the work has been clamped. The base plate of the jig has a sufficiently large opening (c3, Fig. 3) about the centering tool bushing so that the bushing may be readily passed through the jig after the latter has been mounted on the face plate. The bushing flange 15 overhangs the jig base plate and provides an accurate surface against which the side face of the object may bear.

It will be seen that my centering tool is readily adapted for machines having live spindles with the usual spindle taper bore back of the center of the face plate. The bushing 10 of my tool makes an adapter reducing that bore to the proper size for receiving the cylindrical shank of the centering tool. When the centering tool has been put into position its shank fits the bore of the bushing but the tool may be rotated manually in either direction if it is desired to change the position of the radial blocks before the centering takes place. The actual centering is accomplished very quickly by the operator simply grasping the hollow boss 23 of the centering tool and the cap 32 and rotating the latter as far as may be easily done by a manual grasp of it. This accurately positions the work, ready for the set screws of the jig to be tightened against it and themselves thereafter clamped by the jig clamping screws. Then the backward rotation of the screw threaded knob on the centering tool releases the radial blocks and the tool may be readily withdrawn from the bore of the bushing.

An advantage of the present invention is the fact that an irregularly shaped article such as a connecting rod may be quickly centered in a work spindle for regrinding the bushing at one end thereof. Prior to this time, the practice has been to discard a worn connecting rod because of the fact that the time required to center it in a machine for regrinding purposes has been more than the cost of a new rod. With the present invention, however, the rod may be centered and ground within a few minutes, so that it is now more profitable to salvage connecting rods than to replace a worn one with a new one. In fact, the savings resulting from the invention will pay for the machine in a very short time.

I claim:

1. A centering device for a machine tool, comprising an externally tapered bushing adapted to occupy a tapered opening in the work spindle of the machine tool, said bushing having an internal cylindrical bore, a tool proper having a cylindrical shank adapted to occupy the bore of the bushing and having a head and a tubular boss on the other side of the head, a plunger mounted in the tubular boss having a cone on the inner end engaging the bevelled ends of radially movable blocks slidably mounted in the head, a screw thread on the exterior of said boss, a cap secured to the end of the plunger and having internal threads to engage the external thread on the boss whereby the rotation on the cap may force the plunger inwardly.

2. A centering device having a cylindrical shank adapted to occupy a suitable bore and having a head and a tubular boss on the other side of the head, a plunger mounted in the tubular boss and adapted to act on radially movable blocks slidably mounted in the head, and means to force the plunger inwardly to cause the spreading of the blocks, said head being made of two separate disk-like members having mating grooves made in their inner faces, said disks being secured together by screws to provide ways for the blocks.

3. The combination with the machine tool, having a rotatable work spindle carrying a face plate, of a jig adapted to be secured to the face plate and having an opening through it in registration with the spindle, a centering tool having a shank adapted to pass through the opening in the jig and be centered by the spindle, said tool having a head carrying a centering device adapted to engage the wall of an opening in an article adapted to be positioned thereby, said jig having means for clamping the positioned article.

4. The combination of a machine tool having a work spindle with a tapered opening in its endmost portion, and carrying a face plate and a jig adapted to be secured to the face plate and having an opening concentric of the spindle axis, a tapered bushing adapted to occupy the tapered opening of the spindle, having a flange overhanging the base of the jig, the centering tool having a shank adapted to occupy the bushing and having a head with an expanding mechanism adapted to occupy an opening in the work resting against the flange of the bushing, said expanding mechanism being operable from beyond the work to center it and enable it to be thereafter clamped by the jig, after which the centered device may be manually removed without disturbing the position of the work.

5. A centering tool having a shank adapted to removably engage a bore in the work spindle of a machine tool, said shank having an enlarged head, rigid therewith, a plurality of radially movable blocks mounted in the head and carried solely thereby, said head having a tubular boss on the opposite side from the shank, a plunger mounted in said boss carrying a cone at its inner end adapted to bear on the inner ends of the blocks, and means for forcing the plunger axially to move the blocks radially.

6. A self-contained centering tool adapted for removable mounting in the rotating spindle of a machine tool, said centering tool comprising a head, blocks carried entirely by the head and movable radially in planes normal to the axis of rotation, a cylindrical shank axial of the head on one side thereof, and rigid therewith, a hollow boss axial of the head on the opposite side thereof, and rigid therewith, a plunger axially movable in the boss and carrying a cone at its inner end engaging the inner ends of the blocks, and a screw-threaded operating member engaging the boss and plunger for moving the latter axially.

7. A self-contained removable centering device comprising a shank adapted to occupy a bore in a machine tool, a head rigid on the shank, radially movable blocks in the head carried solely thereby, spring-pressed members carried by the head engaging the sides of the respective blocks to provide proper friction tending to hold the blocks in any given position, and means carried by the head for forcing the blocks outwardly.

8. A centering tool comprising a shank adapted to be removably secured to a work spindle, a head rigid with the shank, a plurality of radially movable blocks mounted in the head and removable therewith, said blocks having adjacent inner ends which are bevelled, a hollow boss rigidly carried by the head on the opposite side from the shank, a plunger mounted in the hollow boss and having a cone at the inner end engaging the blocks, a cap secured to the outer end of the plunger and having an internal thread meshing with an external thread on said hollow boss.

JOHN Y. BLAZEK.